No. 827,331. PATENTED JULY 31, 1906.
L. A. TIRRILL.
DYNAMO ELECTRIC MACHINE.
APPLICATION FILED FEB. 17, 1905.

2 SHEETS—SHEET 1.

WITNESSES:
George A. Thornton
Helen Oxford

INVENTOR:
Leonard A. Tirrill,
By Albert G. Davis
Att'y.

No. 827,331. PATENTED JULY 31, 1906.
L. A. TIRRILL.
DYNAMO ELECTRIC MACHINE.
APPLICATION FILED FEB. 17, 1905.

2 SHEETS—SHEET 2.

WITNESSES:

INVENTOR:
Leonard A. Tirrill,
By Albert G. Davis
Att'y.

UNITED STATES PATENT OFFICE.

LEONARD A. TIRRILL, OF LYNN, MASSACHUSETTS, ASSIGNOR TO GENERAL ELECTRIC COMPANY, A CORPORATION OF NEW YORK.

DYNAMO-ELECTRIC MACHINE.

No. 827,331.　　　　Specification of Letters Patent.　　　Patented July 31, 1906.

Application filed February 17, 1905. Serial No. 246,012.

*To all whom it may concern:*

Be it known that I, LEONARD A. TIRRILL, a citizen of the United States, residing at Lynn, in the county of Essex and State of Massachusetts, have invented certain new and useful Improvements in Dynamo-Electric Machines, of which the following is a specification.

It is sometimes desirable to construct dynamo-electric machines comprising two or more units or machines, such as a motor and a generator or the like, in a very compact manner and so as to minimize the floor-space required by them.

My present invention has for its object the attainment of the above-noted features, and comprises novel features of construction and arrangement, which are pointed out with particularity in the claims annexed to and forming a part of this specification.

For a better understanding of my invention reference may be had to the accompanying drawings and description, in which I have illustrated and described one embodiment of my invention.

Figure 1:
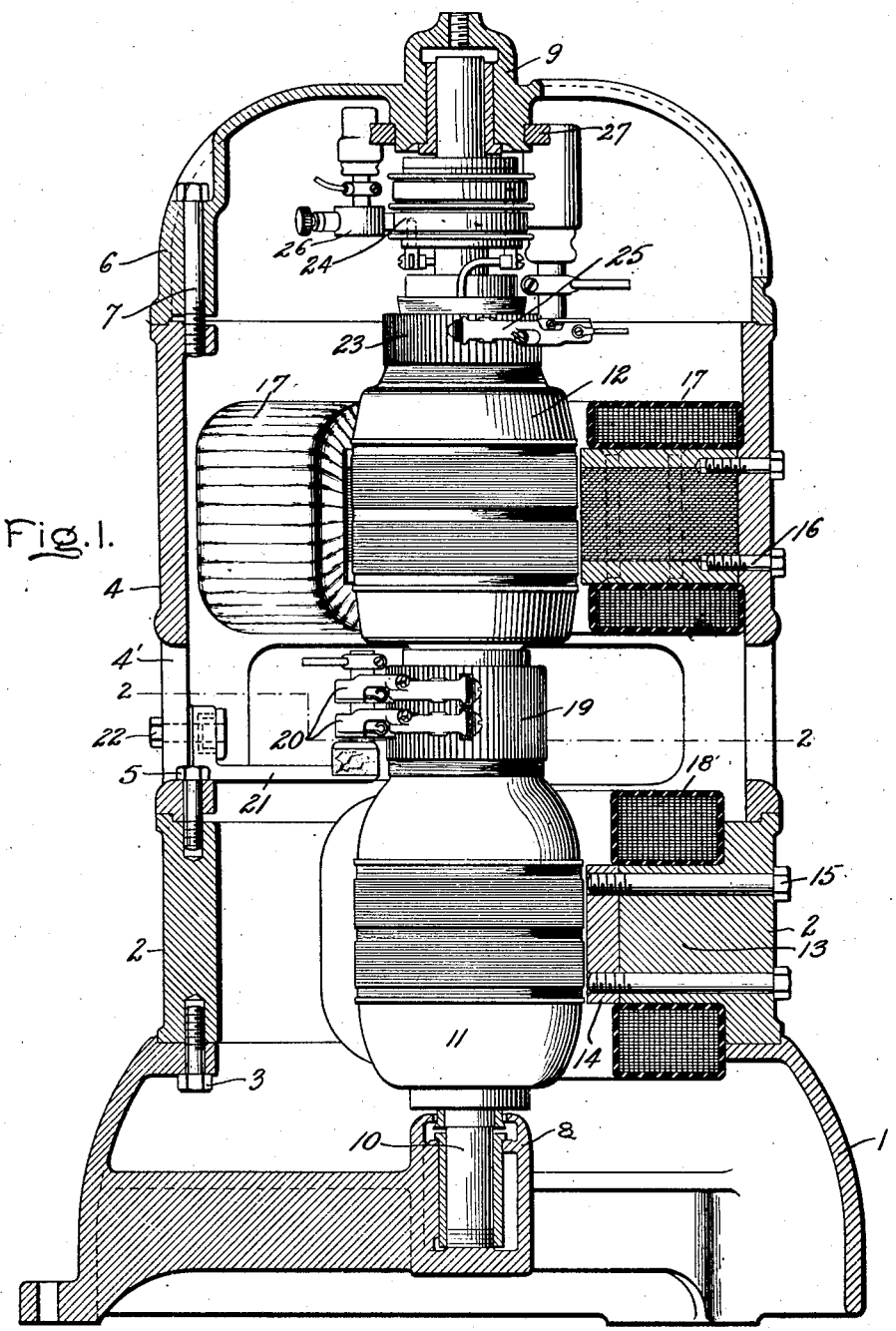
Figure 2:
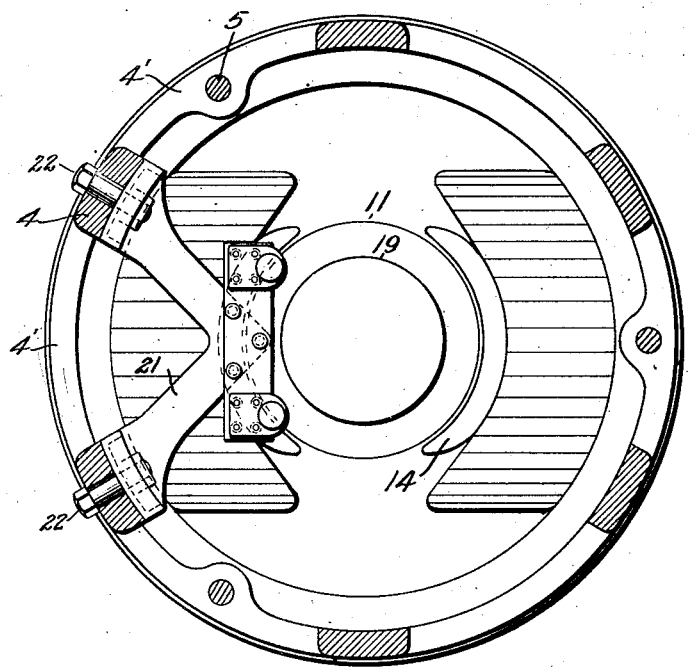

Of the drawings, Figure 1 is a sectional elevation showing a dynamo-electric machine constructed in accordance with my invention; and Fig. 2 is a partial section on the line 2 2 of Fig. 1, showing certain details of construction.

Referring to the drawings, 1 represents the base member of a vertical motor-generator set suitable for use in signal-towers or the like where compactness and the use of a minimum amount of floor-space is desirable. On the base 1 is mounted the field-ring 2 of the lower unit of the machine. The field-ring and the base 1 are secured together by bolts 3. The field-ring 4 of the upper unit of the machine is secured to the upper end of field-ring 2 by bolts 5, which are parallel to the axis of the rings 2 and 4. As shown, the upper field-ring is cut away to form spaces 4', which permit the insertion of the bolts 5 in threaded openings which are formed in the end of the field-ring 2. A top member 6 is secured to the upper end of the field-ring 4 by bolts 7. The base member carries a bearing 8 and the top member 6 a bearing 9. A shaft 10, journaled in the bearings 8 and 9, carries armatures 11 and 12, which coöperate with the field-rings 2 and 3, respectively.

In the construction shown the pole-pieces 13 for the lower unit of the machine are integral with the field-ring 2, though separate pole-tips 14 are employed. In the construction shown the ring 2 and the pole-pieces 13 are preferably formed of cast-steel. The pole-tips 14 are secured in place by bolts 15. The pole-pieces for the upper units are shown as laminated and are secured by suitable bolts 16 to the ring 4, which may in the construction shown be advantageously formed of cast-iron. The pole-pieces for the upper and lower units are surrounded by windings 17 and 18 of the usual form.

The armature for the lower unit, which in the particular construction illustrated is a direct-current motor, is provided with a commutator 19. The brush-holders 20, coöperating with the commutator 19, are carried by a bracket 21, which is adjustably secured to the upper field-ring 4 by bolts 22. Where, as in the present case, the upper field-ring is of cast-iron and the lower ring is of cast-steel, there is some advantage in providing the space necessary for the commutator and brush-holders of the lower unit by increasing the length of the cast-iron field-ring rather than by increasing the length of the cast-steel ring.

The armature for the upper unit, which in the particular construction shown is a self-exciting alternating-current generator, is provided with a commutator 23 for supplying direct current to the windings 17 and with a collector-ring 24 for supplying alternating current to the external circuit. The brush-holders 25 and 26 for the upper unit are carried by a yoke 27, which is mounted in the usual way on the bearing-box 9, carried by the upper end member 6.

The construction described is exceedingly simple and compact. The parts to be fitted together can be readily machined and a very rigid mechanical construction is obtained. By the employment of a vertical unit the minimum amount of floor-space is used. By connecting the field-rings directly together both material and space are economized.

What I claim as new, and desire to secure by Letters Patent of the United States, is—

1. In combination, a pair of field-rings, both of said field-rings being vertically disposed and one placed directly on top of and secured to the other, a shaft, and two revolving elements carried thereby, one of said elements coöperating with one of said field-rings and the other of said elements coöperating with the other of said field-rings.

2. In combination, two field-rings of dynamo-electric machines, both of said field-rings being placed with their axes vertical and in alinement with each other, and one of said field-rings being placed above and directly secured to the other.

3. In combination, a pair of dynamo-electric-machine field-rings, placed one above the other and with their axes in alinement, one of said field-rings being formed with openings or spaces in the end adjacent the other field-ring, and bolts for securing the field-rings together inserted in said spaces and extending parallel to the axes of said machines.

4. In combination, a base, a lower field-ring secured thereto with its axis vertically disposed, an upper field-ring with its lower end resting on and secured to the upper end of the lower field-ring, a shaft and two armatures carried thereby, one coöperating with one of said field-rings and the other with the other of said field-rings, a commutator for one of said armatures, and a brush-holder coöperating therewith carried by the field-ring coöperating with the other armature.

5. In a vertical-shaft motor-generator, a motor field-ring formed of cast-steel, a generator field-ring formed of cast-iron resting upon the upper end of the first-mentioned field-ring and directly secured thereto, a vertical shaft and two armatures carried thereby, one armature coöperating with the lower field-ring and the other with the upper field-ring, a commutator for the lower armature, and brush-holders coöperating therewith secured to the upper field-ring.

6. In combination, a field-ring having its axis vertically disposed, a second field-ring placed with its lower end resting on and supported by the upper end of the first-mentioned field-ring, means for securing the field-rings together, one of said field-rings being formed of cast-iron and the other of cast-steel, armatures coöperating with the field-rings, and brush-holders for the armatures coöperating with the field-ring formed of cast-steel supported by the field-ring formed of cast-iron.

7. In combination, a base, a field-ring secured thereto and arranged with its axis vertically disposed, a second field-ring with its lower end resting on and secured to the upper end of the first-mentioned field-ring, a top member secured to the upper end of the upper field-ring, a vertical shaft having one end journaled in the base and the other in the top member, and two armatures carried by said shaft, one of said armatures coöperating with the lower field-ring, and the other of said armatures coöperating with the upper field-ring.

In witness whereof I have hereunto set my hand this 14th day of February, 1905.

LEONARD A. TIRRILL.

Witnesses:
   JOHN A. McMANUS, Jr.,
   DUGALD McK. McKILLOP.